(12) United States Patent
Arumugam et al.

(10) Patent No.: US 12,104,379 B2
(45) Date of Patent: Oct. 1, 2024

(54) MICROBIAL GROWTH AND DUST RETARDANT ROOFING SHINGLES

(71) Applicant: CertainTeed LLC, Malvern, PA (US)

(72) Inventors: Rathish Sathyabama Arumugam, Kelambakkam (IN); Sriram Yagneswaran, Nagar (IN); Vinay Natrajan, Chennai (IN)

(73) Assignee: CERTAINTEED LLC, Malvern, PA (US)

( * ) Notice: Subject to any disclaimer, the term of this patent is extended or adjusted under 35 U.S.C. 154(b) by 0 days.

(21) Appl. No.: 17/473,662

(22) Filed: Sep. 13, 2021

(65) Prior Publication Data
US 2022/0064954 A1 Mar. 3, 2022

Related U.S. Application Data

(62) Division of application No. 16/225,811, filed on Dec. 19, 2018, now Pat. No. 11,118,352.

(30) Foreign Application Priority Data

Dec. 20, 2017 (IN) .............................. 201741045846

(51) Int. Cl.
*E04D 1/30* (2006.01)
*C08K 5/05* (2006.01)
(Continued)

(52) U.S. Cl.
CPC ................ *E04D 1/30* (2013.01); *C08L 33/12* (2013.01); *C08L 83/08* (2013.01); *C09D 5/1637* (2013.01);
(Continued)

(58) Field of Classification Search
CPC .... C08K 5/05; C08K 5/10; C08K 5/19; C08L 33/04; C08L 33/12; C08L 83/08;
(Continued)

(56) References Cited

U.S. PATENT DOCUMENTS

| | | |
|---|---|---|
| 3,794,736 A | 2/1974 | Abbott |
| 3,860,709 A | 1/1975 | Abbott |

(Continued)

FOREIGN PATENT DOCUMENTS

| | | |
|---|---|---|
| CA | 2122080 C | 12/1994 |
| CN | 1022246753 A | 11/2011 |

(Continued)

OTHER PUBLICATIONS

Ash Grove Packaging, "Zycosil Multi Surface Sealer" brochure, 2011.

(Continued)

*Primary Examiner* — Hai Vo
(74) *Attorney, Agent, or Firm* — Abel Schillinger, LLP; Stephen Eland

(57) ABSTRACT

A microbial growth and dust retardant roofing shingle comprising a substrate and a pore filling composition applied on the surface of the substrate is disclosed. The pore filling composition comprises a silane or acrylic composition. A method of protecting a substrate from microbial growth and soiling using the pore filling composition of the present disclosure is also disclosed.

10 Claims, 5 Drawing Sheets

(51) Int. Cl.
*C08K 5/10* (2006.01)
*C08K 5/19* (2006.01)
*C08L 33/12* (2006.01)
*C08L 83/08* (2006.01)
*C09D 5/16* (2006.01)
*C09D 133/04* (2006.01)

(52) U.S. Cl.
CPC .............. *C09D 133/04* (2013.01); *C08K 5/05* (2013.01); *C08K 5/10* (2013.01); *C08K 5/19* (2013.01); *E04D 2001/308* (2013.01); *Y10T 428/249955* (2015.04); *Y10T 428/249987* (2015.04)

(58) Field of Classification Search
CPC ........... C09D 133/04; E04D 1/20; E04D 1/30; E04D 13/002; E04D 2001/005; E04D 2001/308; Y10T 428/249955; Y10T 428/249987
See application file for complete search history.

(56) References Cited

U.S. PATENT DOCUMENTS

| | | | |
|---|---|---|---|
| 4,406,892 A | 9/1983 | Eudy | |
| 4,648,904 A | 3/1987 | DePasquale | |
| 4,877,654 A | 10/1989 | Wilson | |
| 5,051,129 A | 9/1991 | Cuthbert | |
| 5,110,684 A | 5/1992 | Cooper | |
| 5,209,775 A | 5/1993 | Bank | |
| 5,216,864 A | 6/1993 | Urgero | |
| 5,300,327 A | 4/1994 | Stark-Kasley | |
| 5,308,890 A * | 5/1994 | Snyder | C09D 151/003 525/902 |
| 5,421,866 A | 6/1995 | Stark-Kasley | |
| 5,599,586 A | 2/1997 | Israel | |
| 6,683,126 B2 | 1/2004 | Keller | |
| 6,919,398 B1 | 7/2005 | Born | |
| 7,083,828 B2 | 8/2006 | Muller | |
| 7,521,573 B2 | 4/2009 | Mehta | |
| 7,532,598 B2 | 5/2009 | Muller | |
| 7,553,983 B2 | 6/2009 | Ranka | |
| 7,704,561 B2 | 4/2010 | Mehta | |
| 8,058,342 B1 | 11/2011 | Stevens | |
| 8,333,829 B2 | 12/2012 | Liversage | |
| 9,303,407 B2 | 4/2016 | Sexauer | |
| 9,714,512 B2 | 7/2017 | Sexauer | |
| 2003/0175438 A1 | 9/2003 | Reeve | |
| 2003/0180440 A1 | 9/2003 | Elfersy | |
| 2004/0110639 A1* | 6/2004 | Joedicke | E04D 13/002 504/151 |
| 2005/0072110 A1* | 4/2005 | Shiao | E04D 5/12 52/741.1 |
| 2006/0068118 A1 | 3/2006 | Reeve | |
| 2006/0235143 A1 | 10/2006 | Muller | |
| 2006/0251807 A1* | 11/2006 | Hong | E04D 7/005 427/212 |
| 2007/0036906 A1 | 2/2007 | Reeve | |
| 2008/0241516 A1* | 10/2008 | Hong | C04B 20/1074 977/773 |
| 2009/0069270 A1 | 3/2009 | McMahon | |
| 2011/0027533 A1 | 2/2011 | Kennedy | |
| 2011/0159240 A1* | 6/2011 | Shiao | B82Y 30/00 977/773 |
| 2012/0070481 A1 | 3/2012 | Bolkan | |
| 2015/0240495 A1 | 8/2015 | Vermillion | |
| 2017/0347646 A1 | 12/2017 | Macinga | |
| 2018/0002565 A1 | 1/2018 | Overman | |
| 2018/0346735 A1* | 12/2018 | Wu | C08F 220/12 |
| 2020/0018068 A1 | 1/2020 | Smith | |

FOREIGN PATENT DOCUMENTS

| | | | |
|---|---|---|---|
| EP | 350240 A * | 1/1990 | ............ C08F 230/08 |
| WO | 2009144495 A2 | 12/2009 | |

OTHER PUBLICATIONS

Zydex Industries "Nano Technology—A boon to construction industry" presentation, 2008.
Tile Doctor Shield, Material Safety Data Sheet, Apr. 23, 2010.

* cited by examiner

FIG. 5

MICROBIAL GROWTH AND DUST RETARDANT ROOFING SHINGLES

This application is a divisional of U.S. patent application Ser. No. 16/225,811, filed Dec. 19, 2018, which claims the benefit of priority of Indian Patent Application no. 201741045846, filed Dec. 20, 2017, each of which is hereby incorporated herein by reference in its entirety.

BACKGROUND OF THE DISCLOSURE

Technical Field

The present disclosure relates generally to roofing shingles, and particularly, relates to protection of roofing shingles from microbial growth and dust accumulation.

Background

Background description includes information that may be useful in understanding the present disclosure. It is not an admission that any of the information provided herein is prior art or relevant to the presently claimed invention, or that any publication specifically or implicitly referenced is prior art.

Roofing shingles are installed on the roofs of buildings to provide protection from weather and also add aesthetic appeal. Typically, the roofing material is constructed of a surface provided with an asphalt coating on the surface, and a layer of granules embedded on top of the asphalt coating.

In many areas, depending on ambient conditions, the roofing shingles develop stains that darken the color of the shingle. This is quite common in tropical, semi-tropical and high humidity areas. This discoloration appears to be caused by the development of various microorganisms and their residues, e.g. bacteria, algae, fungi, yeast and the like. The discoloration may be caused due to the microbial growth itself or may be produced indirectly as a result of microbial metabolic products. The discoloration generally starts to occur over a period of few years. In some climatic conditions the micro-organisms grow directly over the shingle, while in a few other climatic conditions microbial growth is found over the thick layers of dust formed as inorganic settlement deposited over the shingles. This inorganic settlement of dust in turn helps in development of microbes.

When the micro-organisms are developed over the shingles the stains created by microbes and their residues adhere to the granules and over a period of time become increasingly difficult to be removed. On the other hand, when microbial growth develops over thick dust layers, they are loosely adhered to the shingle surface and could be easily washed off during sporadic rains or simply by washing with water. As the shingles are washed when weathered, they corrode and the subsequent erosion carries the settled dust and microorganisms over the exposed face of the shingles. The discoloration increases over the years and generally becomes visible during the second or third year after the roofing shingles have been applied in warm and humid climates.

This discoloring is particularly noticeable and distasteful on white or light-colored roofing materials, which are often used in humid climates because of their aesthetic and solar reflective properties. The discoloration could worsen to a condition where the white roofing starts to appear black over a few years of exposure to weathering. This condition of darkening or blackening occurring in a relatively early life of these shingles is unsightly and has resulted in the rejection of shingles by builders and property owners. Further, the adverse effects of darkening of light colored shingles is that they increase the heat absorption of the roof thereby failing the very purpose of providing light roof shingles in hot climates.

Most of the solutions that are available currently in the market are targeted towards eliminating the microbes. To combat microbial growth, it is generally known to include microbe resistant granules on the exposed surface of the roofing material. One type of microbe resistant granule is a granule coated with a glass or ceramic coating containing a microbial active ingredient, such as for example copper, silver or copper/silver compounds. When wetted by rain or dew, the copper leaches out from the roofing material and acts as a microcide and/or a fungicide to inhibit the growth of microorganisms. Canadian patent application CA2122080 discloses copper-containing algae-resistant granules on an asphalt shingle.

One other method used to alleviate staining include adding copper or zinc strips along the ridges. U.S. Pat. No. 5,216,864 discloses metallic strip of a zinc alloy for attachment to a shingled roof to prevent or inhibit growth of fungus and moss. However, adding these strips affects the aesthetics of the roof. Also, these strips help to reduce staining on the shingles only to a particular depth. Further, it fails to remove the inorganic settlement over which the microbial growth occurs.

Another method is applying acrylic coatings on the shingles. The acrylic coating helps to prevent algal growth and also helps in preventing loss of granules from the shingle due to weathering. U.S. Pat. No. 5,599,586 discloses a thin unpigmented film comprising of polyacrylate emulsion polymer for protection against the growth of dark colored algae on the cementaceous and composite asphalt building materials. U.S. Pat. No. 8,058,342 discloses a sealing and protecting composition for asphalt shingle comprising acrylic polymer that has been modified by a silicone surfactant to alter its wetting properties so as to promote wicking of the sealer under asphalt shingles and at open edges to prevent curling and water infiltration. The composition also consists of a biocide viz. copper sulfate to protect the roof from algae, mold, or mildew related degradation and staining. However, the composition does not prevent inorganic settlement over the years and thereby drives microbial growth over the shingle.

Despite the knowledge that inorganic dust drives organic matter growth on the shingle, the currently available solution only targets the inhibition of microbial growth. None of the solutions target to reduce the inorganic dust that is accumulated over the shingles.

Further most of the available solutions are factory made microorganisms' resistant shingles that are installed on the roofs. Most of these shingles do not sustain stain resistance for longer periods. Therefore, when shingles are stained, the only available solution seems to have them replaced which again is not cost effective.

Hence there is a need to develop a solution for reducing the inorganic matter buildup on shingle, which will enable easy washing off of stains from the shingle. Further, it would be desirable to have a microorganism resistant shingle for improved performance and cost effectiveness. In addition to this a solution is required that can be applied to the shingle that has already been installed on a roof so that the staining on the top of the shingles could be considerably reduced and one that can be used when required.

The present invention discloses a microbial growth and dust retardant roofing shingle that can overcome the drawbacks as mentioned above.

SUMMARY OF THE DISCLOSURE

One aspect of the present disclosure provides a microbial growth and dust retardant roofing shingle comprising a substrate and a pore filling composition applied on the surface of the substrate. The substrate comprises at least one substrate material selected from the group consisting of an asphalt shingle, a fiberglass shingle or a siding material. The pore filling composition comprising about 6% to 20% of an alcohol; about 60% to 70% of an organosilane active quaternary halide salt group; about 4% to 10% of an ester and optionally about 1% of an ammonium salt.

In another aspect of the present disclosure, a microbial growth and dust retardant roofing shingle, comprising a substrate and a pore filling composition applied on surface of the substrate is disclosed. The substrate comprises at least one substrate material selected from the group consisting of an asphalt shingle, a fiberglass shingle and a siding material. The pore filling composition comprising about 45% to 55% polymer of a methyl methacrylate; about 45% to 50% of polymer of butyl acrylate and about 3% to 5% of polymer of ethyl acrylate.

Other features and aspects of this disclosure will be apparent from the following description and the accompanying drawings.

BRIEF DESCRIPTION OF THE DRAWINGS

Embodiments are illustrated by way of example and are not limited in the accompanying figures.

FIG. 5 illustrates microbial activity over the shingles with different combinations of pore filling composition, according to an embodiment of the present disclosure.

Figure 1:
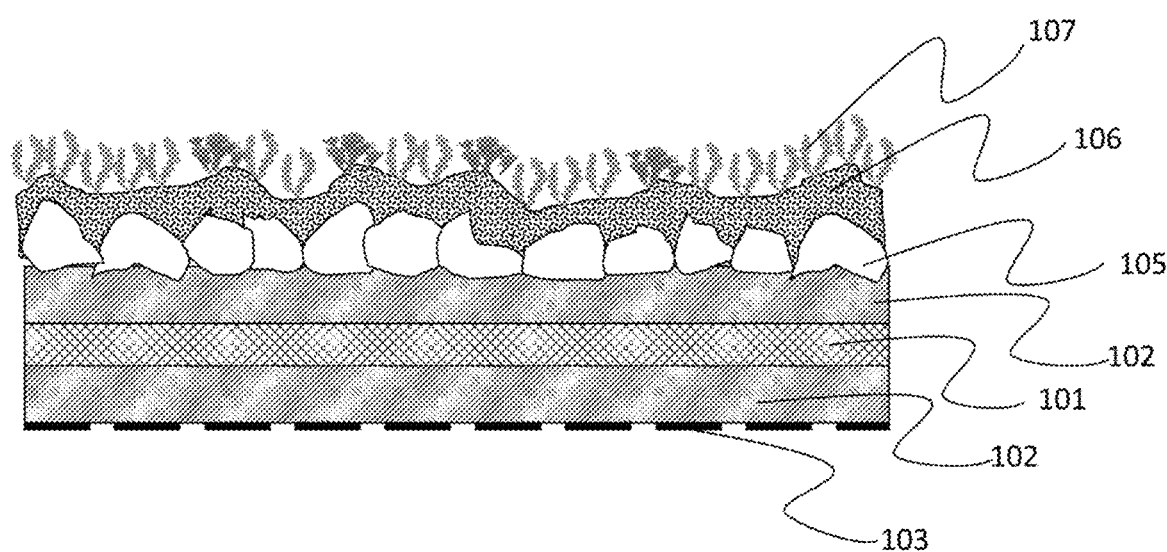
FIG. 1 illustrates a conventional shingle with dust, microbial growth and microbial residue, according to an embodiment of the present disclosure.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The present invention is now discussed in more detail referring to the drawings that accompany the present application. In the accompanying drawings, like and/or corresponding elements are referred to by like reference numbers.

The dark stains common on roofs in India and other humid areas are the result of microbial growth starting in a few colonies and ultimately covering the entire roof. Biodeterioration inhibitors added to the surface covering, e.g. asphalt shingles in accordance with the invention inhibit growth of microorganisms, thus preventing the widespread unsightly darkening.

Broadly stated, the present disclosure comprises providing a surface covering which incorporates a retardant to safeguard against microbial growth and consequent discoloration of the surface material which is more effective and is over a period of many years. This effect may be obtained by applying a pore filling composition at the top surface of a shingle so that microbial growth is inhibited thereby inhibiting staining that mars the appearance of shingles.

The present invention is particularly advantageous in connection with shingles which have white or light colored granules. Even with dark colored shingles, a variation in texture of the shingle is noticeable rather than a difference in color. Thus, even with dark colored shingles, the advantage of retarding microbial growth and in turn reducing the stains provided by the concept of the present disclosure is substantial. The present disclosure provides a shingle resistant to microorganisms characterized by an aesthetically improved appearance is disclosed.

The roofing shingle with pore filling composition are capable of furnishing a long-lasting microbial growth inhibition, i.e. a long-lasting source of inhibitor product that withstands weathering action on the exposed surfacing article and also precludes the growth of microorganisms by interfering with their development processes.

The present disclosure provides a microbial growth and dust retardant roofing shingle, comprising a substrate and a pore filling composition applied on the surface of the substrate. The term soiling and dust means the same and can be used interchangeably in the present disclosure. The substrate comprises at least one material selected from the group consisting of an asphalt shingle, a fiberglass shingle, laminate shingles and a siding material. In an embodiment, the substrate consists of a ceramic granule. The most visible aspect of the substrate is the granules surfaced on top of it. Hard rock with certain physical properties is crushed and screened to exact granular size specifications. The granules are either applied as such in their natural stone-colored state or are processed into a variety of colors via ceramic firing to give them the long-lasting colors used on the exposed part of the shingle. Some substrates feature an algae-resistant granule that helps inhibit discoloration caused by blue-green algae. Further special "reflective" granules can also be used to make roofing substrates that reflect a higher percentage of solar radiation. The ceramic granules optionally consist of copper coated ceramic granules. Copper coated granules protect the substrate against staining caused by algae.

In an embodiment, the pore filling composition comprising of about 6% to 20% of an alcohol; about 60% to 70% of an organosilane active quaternary halide salt group; about 4% to 10% of an ester and optionally about 1% of an ammonium salt. The alcohol is selected from the group consisting of ethanol, methanol, propanol, isopropanol and/or their combination thereof. The organosilane active quaternary halide salt group is selected from the group consisting of N-tert-butyldimethylsilylimidazole chloride, Tetradecyldimethyl (3-Trimethoxysilylpropyl) Ammonium Chloride or N-Trimethoxysilylpropyl-N,N,N-Tri-N-Butylammonium Chloride. The ester is selected from the group consisting of phosphate ester or diester, ethyl acetate and/or their combination thereof. The ammonium salt is quaternary ammonium salt. The quaternary ammonium salt is selected from the group consisting of copper ammonium sulfate, methylpropyldimethyloctadecyl ammonium chloride and/or their combination thereof. The pore filling composition when applied on the surface of the substrate reduces growth and soiling deposits on shingle. The pore filling composition is either applied on the surface of the substrate in-situ or while fabricating the shingle in a factory. Hence, the pore filling composition can be applied to the shingles that has been already installed on the roof over years whenever required. The pore filling composition is transparent and hence the application of it does not change the aesthetic of the shingle while it is located at the uppermost exposed part of the shingle. One skilled in the art appreciates the present disclosure applies to a variety of roofing products.

In another embodiment, the pore filling composition comprising about 45% to 55% of a methyl methacrylate; about 45% to 50% of a butyl acrylate and about 3% to 5% of an ethyl acrylate. The monomeric units can form a copolymer by cross-linking amongst themselves. In another embodiment, the pore filling composition comprising about 45% to 55% polymer of a methyl methacrylate; about 45% to 50% polymer of a butyl acrylate and about 3% to 5% polymer of an ethyl acrylate.

Alternatively, in another embodiment of the present disclosure, any biocide (organic or inorganic) in solid form or one capable of being rendered solid upon application on the surfacing materials and one recognized as an effective inhibitor by those skilled in the art may be added to the pore filling composition. It will be apparent that those substances toxic to humans in the environment and concentration in which they are to be used, are to be avoided. Illustrative compositions which may be used to inhibit microbial growth include various bactericides, fungicides, algicides, mildewicides, bacteriostats, fungistats, antimicrobial compounds and the like.

The term "microorganism", as used herein, is meant to include algae and/or fungi and/or similar microorganisms that can grow on a roofing material. The term microorganism growth or microbial growth means the same and can be used interchangeably. In an embodiment, the microbes are selected from the group consisting of algae, cynobacteria or any combination thereof. The algae are selected from the group consisting of *Scenedesmus vacuolatus, Stichococcus bacillaris* or any combination thereof. The cynobacteria is selected from the group consisting of *Tolypothrix bouteillei, Nostoc commune, Calothrix gardneri* De Toni and any combination thereof.

In an embodiment, the method of protecting the substrate against microbial growth and soiling, comprising of firstly, cleaning and drying the surface of the substrate. Secondly, preparing dilutions of the pore filling composition with water and applying the pore filling composition on the surface of the substrate. The dilution is in the range of 1:15 to 1:25. Preferably, dilution is 1:20. Lastly, drying and applying the surface with the pore filling composition. on the surface of the substrate again.

Alternatively, in an embodiment, the pore filling composition is directly applied without any dilution.

FIG. 1 illustrates a conventional roofing shingle of generally conventional construction and size comprising an asphalt backing 102, fiber glass backing 101 and ceramic granules 105. The asphalt backing 102 is provided above and below the fiber glass backing 101. Upon one of the asphalt backing 102 is ceramic granules 105, and the other asphalt backing 102 below the fiber glass backing 101 is fixed or installed on the roof with the adhesive layer 103. The dust deposit is depicted as 106, which is accumulated over the ceramic granules 105. The microbial growth 107 is illustrated over the dust deposit 106.

Figure 2:
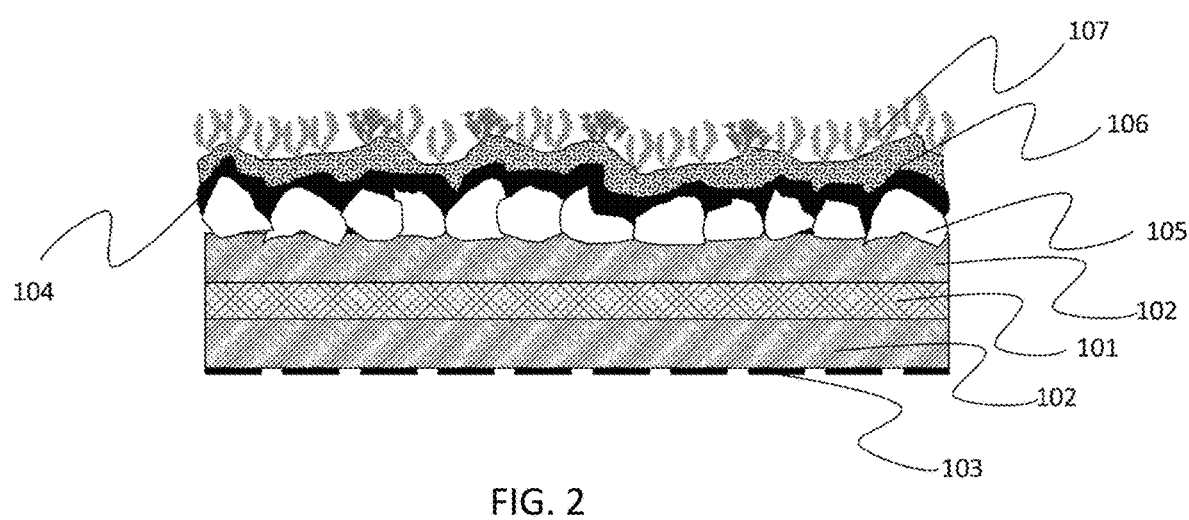
FIG. 2 illustrates a shingle provided with pore filling compositing, dust, microbial growth and microbial residue, according to an embodiment of the present disclosure.

FIG. 2 illustrated a pore filling composition applied to a roofing shingle. The pore filling compositing 104 is applied over the ceramic granules 105. The dust deposit is depicted as 106, which is accumulated over the pore filling composition 104. The microbial growth 107 is illustrated over the dust deposit 106.

The invention will be further described by the following specific examples. It will be understood, however, that although these examples may have described in detail certain preferred operating conditions of the invention, they are given primarily for purpose of illustration only and the invention in its broader aspects is not limited thereto. Note that not all of the activities described above in the general description or the examples are required, that a portion of a specific activity may not be required, and that one or more further activities may be performed in addition to those described. Still further, the order in which activities are listed is not necessarily the order in which they are performed.

Example 1

Preparation of Pore Filling Composition

The following components were mixed together in weight % forming a pore filling composition P1 and P2 as indicated below in table 1 and table 2.

TABLE 1

Pore Filling Composition (P1)

| | Pore Filling Composition (P1) | Weight % |
|---|---|---|
| 1 | Ethanol | 20 |
| 2 | N-tert-butyldimethylsilylimidazole chloride | 69.3 |
| 3 | Alkyltriphenylphosphonium acetate | 9.8 |
| 4 | Copper ammonium sulfate | 0.9 |

TABLE 2

Pore Filling Composition (P2)

| | Pore Filling Composition (P2) | Weight % |
|---|---|---|
| 1 | Poly(methyl methacrylate) (PMMA) | 49.7 |
| 2 | Butyl acrylate | 47.5 |
| 3 | Ethyl acrylate | 2.8 |

Example 2

Pore Filling Composition with Different Dilution

Figure 3:
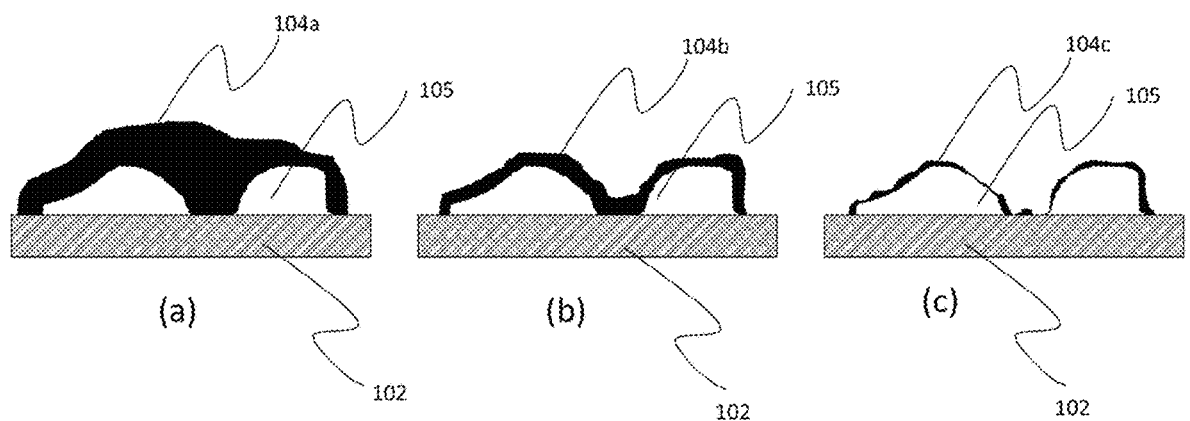
FIG. 3 illustrates interaction of different dilution of pore filling composition with shingle granules, according to an embodiment of the present disclosure.

The pore filling composition P1 is diluted with water, whereas P2 composition is not diluted with water. This is because the organosilane in P1 composition forms a thick layer over the granules of the shingle which is not desirable as the layer can break due to weathering. FIG. 3 illustrates the interaction of different dilutions of pore filling composition P1 with the shingle granules. The dilutions for composition P1 made are 104*a* at 1:5, 104*b* at 1:20 and 104*c* at 1:40. When the pore filling composition is not diluted enough as illustrated in (a), it forms a thick layer over the granules. When the pore filling composition is more diluted, it's visible that it does not wet the shingle granules completely as shown in (c). Thus a preferred dilution would be the one illustrated in FIG. 3B, as the preferred dilution of pore filling composition P1 covers the granules completely but does not form a thick layer over the shingles and is also protected by the granules from weathering.

Example 3

Reducing Dust Deposit Layer

Figure 4:
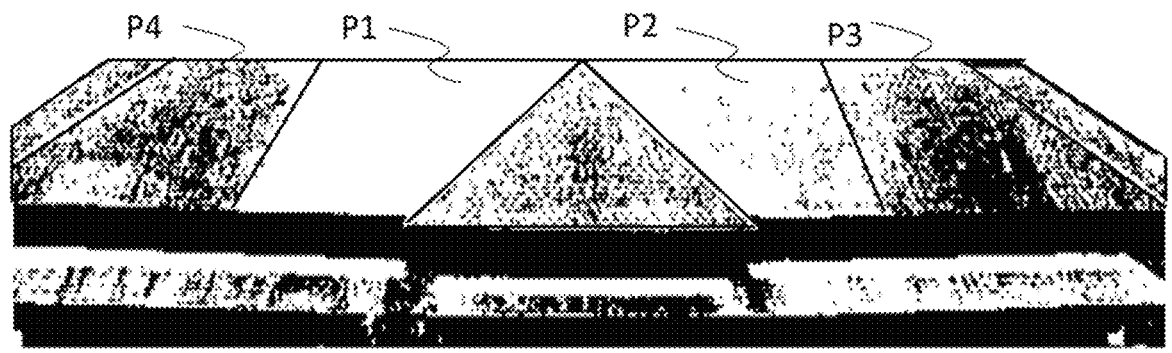
FIG. 4 illustrates dust accumulation over the shingles with different combinations of pore filling composition, according to an embodiment of the present disclosure.

FIG. 4 illustrates dust accumulation over the shingles with different combinations of pore filling composition. The compositions P1 and P2 were applied on top of an existing roof along with commercially available product Roof-Guard™ (By Enviroseal as disclosed in U.S. Pat. No. 8,058,342) indicated as P3 and shingles containing copper coated granules without any coating applied indicated as P4. The image of the roof was taken 2 years after the application of the compositions P1, P2, P3 and P4. From the figure it is evident that the compositions P1 and P2 have considerably lesser dust accumulation and withstands weathering as compared to P3 and P4 indicative of the compositions. P1 shows lesser dust accumulation then P2.

Example 5

Micro-Organisms Retarding Activity

Figure 5:
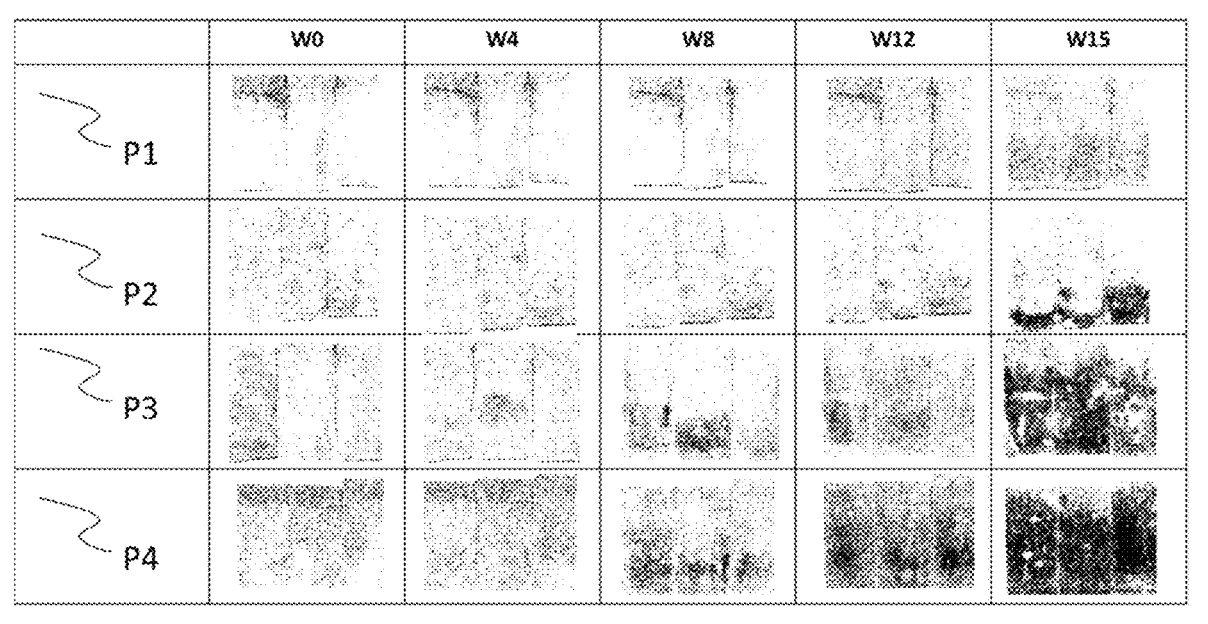

FIG. 5 illustrates microbial activity over the shingles with different combinations of pore filling composition over a period of 15 weeks. The compositions P1 and P2 were applied on top of an existing roof along with commercially available product RoofGuard™ indicated as P3 and the shingle containing copper coated granules and not provided with any coating is indicated as P4.

Samples were placed on 2 racks in a chamber equipped with circulating water sprinkler. Three micro-algae, namely *Stichococcus bacillaris, Nostoc commune* and *Scenedesmus vacuolatus* were inoculated in a growth medium (1 g/L $NaNO_3$; 0.513 g/L $MgSO_4$; 0.187 g/L $K2HPO_4$; 0.063 g/L $Na_2HPO_4$; 0.058 g/L $CaCl_2$); 0.05 $NH_4Cl$; 0.003 $FeCl_3$). The suspension was placed in the bottom of the chamber. Once a day, the suspension was pumped up and spread over the shingles for an hour (from 9:00 am to 10:00 am). The suspension flowed over the samples down to the bottom of the chamber where it was pumped up again (closed loop system).

To favour the growth of algae and mimic outdoor conditions, the samples were illuminated with artificial light (Philips TLD 90 De Luxe Pro-58 W/965) for a period of 12 h in a day (from 8:00 am to 20:00 pm).

The image of the roof was taken during different week (Week 0, 4, 8, 12, 15) after the application of the compositions P1, P2, P3 and P4 as illustrated in FIG. 5. Every week, the image of the samples was taken and the contamination level of each of the sample was evaluated using the following quoting scale:

0=no growth observed with eye
1=very weak growth (scattered)
2=weak growth (<10% surface colonization)
3=medium growth (<25% surface colonization)
4=abundant growth (<50% surface colonization)
5=strong growth (>50% surface colonization)

Table 3 illustrates the percentage of microbial contamination during different week (Week 0, 4, 8, 12, 15)

TABLE 3

| Percentage of microbial contamination | | | | | |
|---|---|---|---|---|---|
| Week | W0 | W4 | W8 | W12 | W15 |
| P1 | 0 | 1 | 1 | 3 | 4 |
| P2 | 0 | 0 | 2 | 4 | 5 |

TABLE 3-continued

| Percentage of microbial contamination | | | | | |
|---|---|---|---|---|---|
| Week | W0 | W4 | W8 | W12 | W15 |
| P3 | 0 | 2 | 5 | 5+ | 5++ |
| P4 | 0 | 3 | 5 | 5+ | 5++ |

As evident from table 3, compositions P1 and P2 were found to work best against microbes. Strong growth of microbes was visible only after week 15 for compositions P1 and P2, while the microbial growth intensified from week 8 for compositions P3 and P4. P1 retards microbial activity for longer period than P2.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The description in combination with the figures is provided to assist in understanding the teachings disclosed herein, is provided to assist in describing the teachings, and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Each patent application or publication, including those found in the Background section, is hereby identified herein by reference in its entirety for all purposes.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A microbial growth and dust retardant roofing shingle, comprising:
    a substrate having an upper surface having a plurality of pores, the substrate being an asphalt shingle having roofing granules at the upper surface thereof, the roofing granules comprising copper coated roofing granules;
    a pore filling composition applied as a coating on the upper surface of the substrate, the pore filling composition being disposed to the pores of the substrate, wherein the pore filling composition consists of:
    (a) 45 wt % to 55 wt % polymer of a methyl methacrylate;
    (b) 45 wt % to 50 wt % polymer of a butyl acrylate;
    (c) 3 wt % to 5 wt % polymer of an ethyl acrylate; and
    wherein the sum of (a), (b) and (c) is 100 wt %.

2. The microbial growth and dust retardant roofing shingle as claimed in claim 1, wherein the substrate comprises ceramic roofing granules at the upper surface thereof.

3. The microbial growth and dust retardant roofing shingle as claimed in claim 1, wherein the pore filling composition is applied as a coating on the upper surface of the substrate to reduce microbial growth and soiling deposits on the roofing shingle.

4. The microbial growth and dust retardant roofing shingle as claimed in claim 1, wherein the pore filling composition is applied as a coating on the upper surface of the substrate in-situ.

5. The microbial growth and dust retardant roofing shingle as claimed in claim 1, wherein the pore filling composition penetrates the pores on the surface of the substrate without forming a layer or film over the roofing shingle.

6. The microbial growth and dust retardant roofing shingle as claimed in claim 1, wherein the pore filling composition is transparent.

7. The microbial growth and dust retardant roofing shingle as claimed in claim 1, wherein the pore filling composition retards the growth of microbes over the roofing shingles.

8. The microbial growth and dust retardant roofing shingle as claimed in claim 1, wherein the pore filling composition are also soiling retardant over the roofing shingles.

9. The microbial growth and dust retardant roofing shingle as claimed in claim 1, where the pore filling composition retards the growth of microbes selected from the group consisting of algae, bacteria and/or any combination thereof.

10. The microbial growth and dust retardant roofing shingle as claimed in claim 1, wherein the pore filling composition is applied on the upper surface of the substrate during fabrication of the roofing shingle in a factory.

* * * * *